United States Patent
Johnson et al.

(10) Patent No.: US 8,972,555 B2
(45) Date of Patent: Mar. 3, 2015

(54) IPSEC CONNECTION TO PRIVATE NETWORKS

(75) Inventors: Robert A. Johnson, Pottstown, PA (US); Avinash Sadhu, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/040,631

(22) Filed: Mar. 4, 2011

(65) Prior Publication Data

US 2012/0226792 A1 Sep. 6, 2012

(51) Int. Cl.
*G06F 15/173* (2006.01)
*H04L 29/06* (2006.01)

(52) U.S. Cl.
CPC .......... *H04L 63/164* (2013.01); *H04L 63/0272* (2013.01); *H04L 63/104* (2013.01)
USPC ............................ 709/223; 709/217; 709/238

(58) Field of Classification Search
CPC .. H04L 63/0272; H04L 63/164; H04L 63/104
USPC .................................... 709/203, 217, 223, 238
See application file for complete search history.

(56) References Cited

U.S. PATENT DOCUMENTS

| | | | |
|---|---|---|---|
| 6,986,061 B1 * | 1/2006 | Kunzinger | 713/153 |
| 2003/0041266 A1 | 2/2003 | Ke et al. | |
| 2004/0083295 A1 | 4/2004 | Amara et al. | |
| 2007/0115940 A1 * | 5/2007 | Kamen et al. | 370/352 |
| 2007/0156919 A1 * | 7/2007 | Potti et al. | 709/238 |
| 2008/0126559 A1 * | 5/2008 | Elzur et al. | 709/232 |
| 2008/0240122 A1 | 10/2008 | Richardson et al. | |
| 2009/0276771 A1 * | 11/2009 | Nickolov et al. | 717/177 |
| 2011/0302313 A1 * | 12/2011 | Diab et al. | 709/227 |
| 2012/0054624 A1 * | 3/2012 | Owens et al. | 715/735 |
| 2012/0170581 A1 * | 7/2012 | Li | 370/392 |

* cited by examiner

*Primary Examiner* — Phuoc Nguyen
(74) *Attorney, Agent, or Firm* — James E. Goepel

(57) ABSTRACT

A server hosting system and method of connecting to managed servers using IPsec are disclosed. The server hosting system includes a plurality of managed servers, and first and second secure communication appliances. The first secure communication appliance is configured to connect to a tenant appliance at a first tenant using an IPsec tunnel, and further configured to route data between a first managed server of the plurality of managed servers and the tenant appliance at the first tenant. The second secure communication appliance is configured to connect to a tenant appliance at a second tenant using an IPsec tunnel, and further configured to route data between a second managed server of the plurality of managed servers and the tenant appliance at the second tenant.

21 Claims, 7 Drawing Sheets

IPSEC CONNECTION TO PRIVATE NETWORKS

TECHNICAL FIELD

The present disclosure relates generally to networking systems; in particular, the present disclosure relates to integration of an IPsec connection to private networks.

BACKGROUND

A server hosting system provides servers for use by multiple customers, or tenants. Computing devices in the server hosting system are located at one or more locations remote from the tenants. For instance, the computing devices in the server hosting system can be located at a premises occupied by a vendor, or offsite from the vendor. Use of server hosting systems is growing in popularity because a server hosting system can enable a tenant to divide the cost of implementing, maintaining, and running servers with other tenants.

A server provided by a server hosting system is sometimes referred to as a managed server. A server hosting system can include a dedicated computing device that exclusively provides an individual managed server for a tenant. Alternatively, the server hosting system can include a computing device that provides multiple virtual managed servers. In this alternative scenario, each of the virtual managed servers functions like a separate server, even though the virtual managed servers are provided by a single computing device.

Preferably, a tenant is able to readily access a managed server in a simple manner, to allow a managed server to approximate the convenience of a local server managed by that tenant. Access, in this context, includes administration of a server hosting system and managed servers included in such a system including adding or deleting managed servers, or controlling access to those managed servers to certain individuals associated with the tenant. To do so, a tenant should be able to communicate data securely with the server hosting system, and use any off-the-shelf networking devices to accomplish this connection. Additionally, the tenant must be able to identify the particular managed server within the server hosting system that the tenant wishes to access.

In some cases, a server hosting system can be secured internally, to protect data exchanged among managed servers. For example, in the case where the managed servers are virtual managed servers, multiple tenants may share a set of those virtual managed servers, but those tenants may not be allowed access to each other's data. One example of such a server hosting system security arrangement is provided by the Stealth data parsing technology provided by Unisys Corporation of Blue Bell, Pa. However, to integrate this data parsing technology at a tenant, the tenant is required to install specialized software or use a particular secure appliance as a gateway to gain access to a server hosting system. In some circumstances, tenants prefer an off-the-shelf networking appliance that allows them to connect to their managed servers at a server hosting system.

One method by which secured communication can be provided is through use of the Internet Protocol Security (IPsec) protocol suite. IPsec is an end-to-end security scheme operating in the Internet Layer of the Internet Protocol Suite. It can be used in protecting data communicated between hosts, gateways, or some combination thereof. IPsec secures IP communication by authenticating and encrypting each IP packet of a communication session. IPsec also includes protocols for establishing mutual authentication between computing systems at the beginning of a communications session and negotiation of cryptographic keys to be used during the session.

Typically, to allow tenants to access managed servers, those tenants would be assigned a set of contiguous IP addresses, such that the server hosting system receiving data packets from a variety of tenants could use subnetting to determine the specific destination managed server for data received from a tenant. However, in these situations, IP addresses can quickly become exhausted, providing an unnecessary limitation on the number of tenants able to connect to a managed server in the server hosting system. Also, because, tenants are allowed to dynamically add and delete servers, server IP addresses are assigned in an unpredictable fashion. This results in non-contiguous IP addresses and segmentation of the available IP address space. Furthermore, because tenants are preferably allowed to assign their own IP addresses to managed servers, those tenants may in fact assign the same IP address to different servers, resulting in the case where two tenants may desire to use two different servers with the same IP address.

Other arrangements use a tag in the IPsec communication packet that identifies the managed server that is the destination of the packet from the tenant. However, this approach requires use of a proprietary addition to the data packet that must be added by a tenant device, and therefore requires that tenants obtain specialized appliances that can handle routing of data packets by applying such tags.

For these and other reasons, improvements are desirable.

SUMMARY

In accordance with the following disclosure, the above and other issues are addressed by the following:

In a first aspect, a server hosting system is disclosed. The server hosting system includes a plurality of managed servers, and first and second secure communication appliances. The first secure communication appliance is configured to connect to a tenant appliance at a first tenant using an IPsec tunnel, and further configured to route data between a first managed server of the plurality of managed servers and the tenant appliance at the first tenant. The second secure communication appliance is configured to connect to a tenant appliance at a second tenant using an IPsec tunnel, and further configured to route data between a second managed server of the plurality of managed servers and the tenant appliance at the second tenant.

In a second aspect, a method of securing communications between a tenant and a server hosting system includes receiving data at a first secure communication appliance from a tenant appliance at a first tenant, and applying a first tag to the data at the first secure communication appliance, the tag identifying the first tenant as the source of the data. The method also includes forwarding the data including the first tag to a first managed server associated with the first tenant.

In a third aspect, a computer storage medium is disclosed. The computer storage medium includes computer-executable instructions, which when executed on a computing device in a server hosting system cause the computing device to provide a first secure communication appliance configured to receive a request to access a managed server from a tenant appliance at a first tenant via an IPsec connection, the first managed server including at least one virtual machine, applying a tag to the data, the tag identifying a virtual secure gateway associated with a tenant, and route the data including the tag to the managed server associated with the first tenant via a virtual local area network switch and the virtual secure gateway.

DETAILED DESCRIPTION

Figure 1:
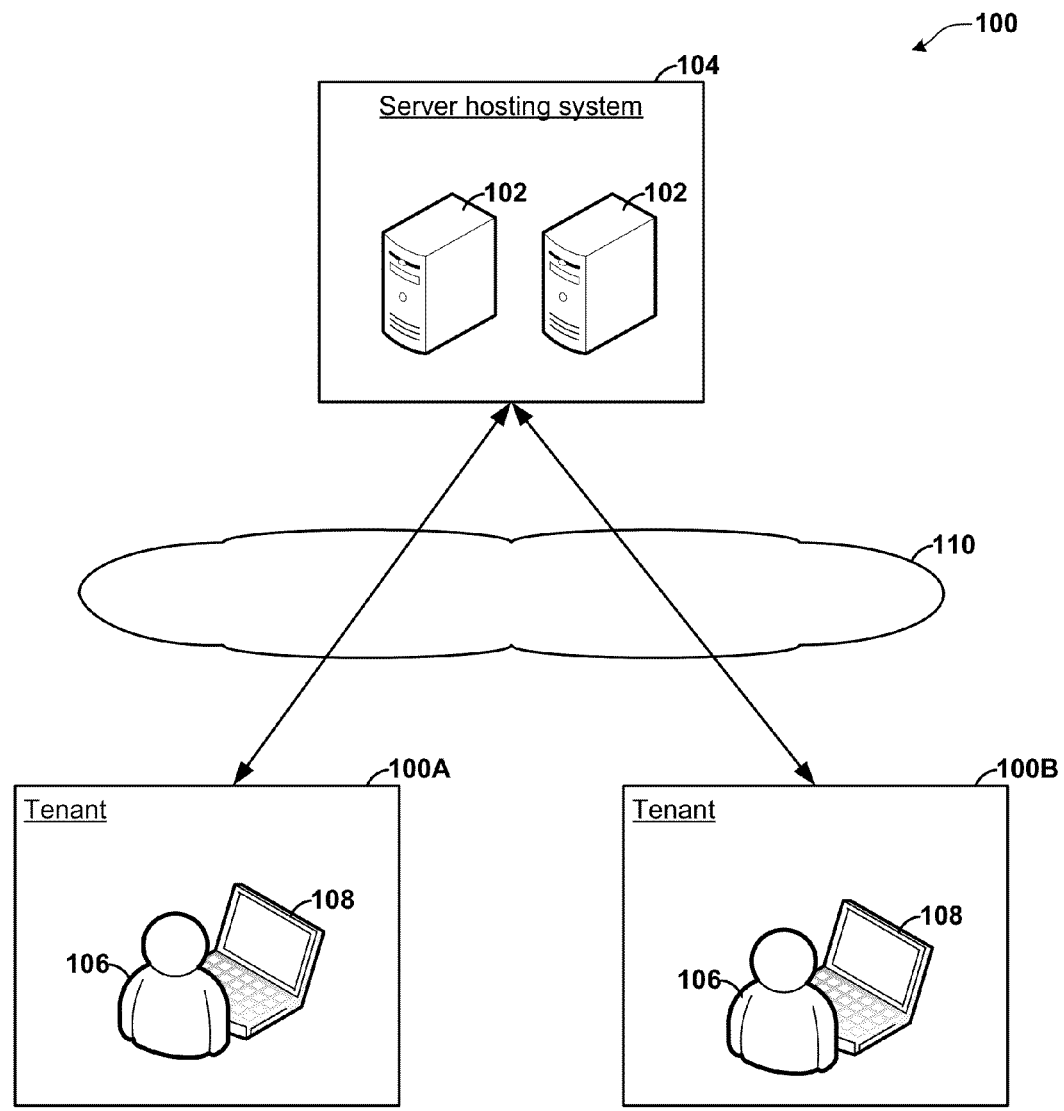
FIG. 1 is a block diagram illustrating an example embodiment in which multiple tenants use managed servers provided by a server hosting system.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to use of an IPsec connection and tenant-dedicated secure communications appliances to route tenant data and access requests to managed servers in a server hosting system that the tenant is authorized to access. By using dedicated appliances per tenant within the server hosting system, the tenant systems are not required to specially identify the data transmitted to the server hosting system via the IPsec connection, and therefore each tenant can use industry-standard, lower cost networking equipment. This extension of the server hosting system also provides increased flexibility in methods by which tenants can access managed servers.

FIG. 1 is a block diagram illustrating an example embodiment in which multiple tenants 100A, 100B use managed servers 102 provided by a server hosting system 104. The tenants 100A and 100B are also referred to herein as the tenants 100. Although the example of FIG. 1 shows only two tenants 100 and two managed servers 102, it should be appreciated that additional tenants can use managed servers provided by the server hosting system 104. The server hosting system 104 can provide additional managed servers.

Each of the tenants 100 is an entity. The tenants 100 can be various types of entities. For example, one or more of the tenants 100 can be business entities, non-profit entities, individual people, government organizations, and so on. Each of the tenants 100 is associated with at least one user 106. The tenants 100 can be associated with the users 106 in various ways. For example, one or more of the users 106 can be employees, agents, users, contractors, or customers of the tenants 100. In other examples, the users 106 can have other relationships with the tenants 100.

The users 106 use computing devices 108. The computing devices 108 can be a variety of different types of computing devices. For example, the computing devices 108 can be personal computers, laptop computers, handheld computers, tablet computers, smart phones, in-car computers, gaming consoles, television set-top boxes, thin-client computers, and other types of computing devices. In some embodiments, one or more of the computing devices 108 are of the types described below with regard to FIG. 7.

The server hosting system 104 includes one or more computing devices. For example, the server hosting system 104 can include one or more standalone server devices, blade server devices, data storage devices, personal computers, mainframe computers, routers, switches, intrusion detection devices, firewall devices, bridges, and other types of computing devices. In some embodiments, one or more of the computing devices in the server hosting system 104 are of the types described below with regard to FIG. 7.

The computing devices of the server hosting system 104 operate to provide the managed servers 102. The computing devices of the server hosting system 104 can operate in various ways to provide the managed servers 102. For example, a computing device in the server hosting system 104 can execute computer-executable instructions that cause the computing device to provide one of the managed servers 102. In another example, a computing device in the server hosting system 104 can include one or more application-specific integrated circuits (ASICs) that operate to provide one of the managed servers 102.

In some embodiments, single computing devices in the server hosting system 104 can provide multiple ones of the managed servers 102 for use by the same or different ones of the tenants 100. In this case, the multiple managed servers provided by a single computing device are "virtual" managed servers. For example, one of the computing devices in the server hosting system 104 can run VMware® software. In this example, the VMware® software provides an operating environment in which multiple virtual managed servers run. In some embodiments, a single computing device of the server hosting system 104 can provide a single one of the managed servers 102 that is dedicated for use by one of the tenants 100. In other embodiments, a single computing device of the server hosting system 104 can provide two or more of the managed servers 102, each of which is dedicated for use by the same tenant 100, or different tenants. However, it is recognized that each of the managed servers 102 is to be associated to a tenant on a one-to-one or many-to-one basis; a managed server 102 is not, according to the embodiments disclosed herein, assigned to more than one tenant 100.

The computing devices 108 used by the users 106 communicate with the server hosting system 104 via a communication network 110. The communication network 110 can include various types of communication networks. For example, the communication network 110 can include the Internet. In another example, the communication network 110 can include one or more wide-area networks, local-area networks, or other types of networks. The communication network 110 can include one or more wired or wireless communication links between computing devices connected to the communication network 110.

Figure 2:
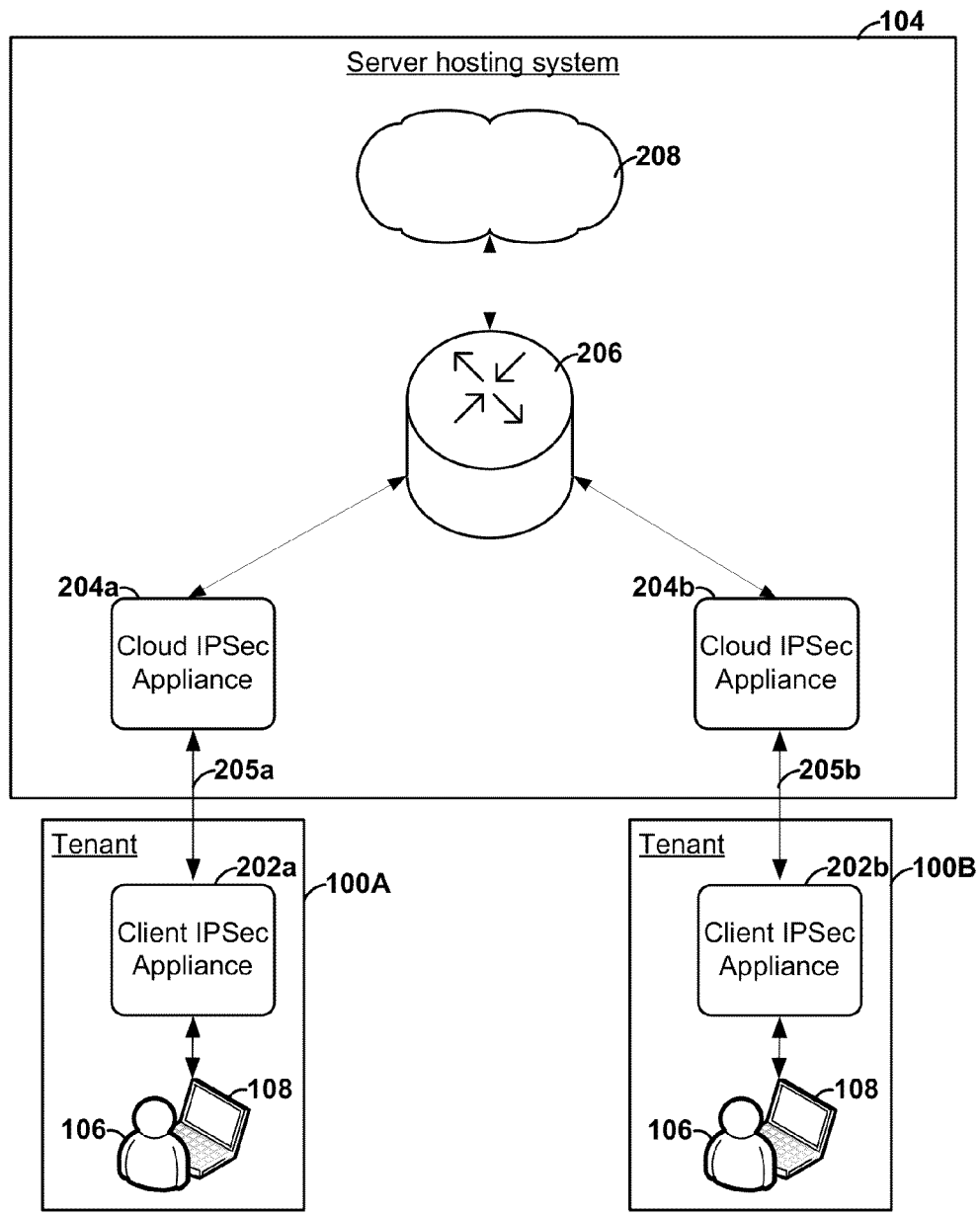
FIG. 2 is a block diagram illustrating example details of an example communication interface to a server hosting system.

FIG. 2 is a block diagram illustrating details of an example communication interface to a server hosting system 104. In this embodiment, each of the tenants 100a-b includes a tenant communication appliance, shown as client IPsec appliance 202a, 202b, respectively. The client IPsec devices 202a-b can collectively be referred to herein as client IPsec appliances 202. The client IPsec appliances 202 are network appliances capable of communicating with remote systems using an IPsec communication protocol. Details regarding the IPsec communication protocol are described in "Security Architecture for the Internet Protocol" published as RFC 4301, and related protocols, available at www.ietf.org. The client IPsec appliances 202 can, in certain embodiments, be generally available networking devices, for example a 5500 series security appliance available from Cisco Systems of San Jose, Calif. Other types of appliances could be used as well.

The server hosting system 104 includes a secure communication appliance, shown as cloud IPsec appliance 204, associated with each tenant 100; in the embodiment shown, a first cloud IPsec appliance 204a communicates with a first client IPsec appliance 202a via an IPsec tunnel 205a, for example over the internet. Similarly, a second cloud IPsec appliance 204b communicates with a second client IPsec appliance 202b via a separate IPsec tunnel 205b. Although additional or fewer cloud IPsec appliances 204 could be included in the server hosting system, in the various embodiments described herein at least one cloud IPsec appliance 204 exists and is dedicated to communication with each tenant 100. The cloud IPsec appliances 204 can each also be, in certain embodiments, a 5500 series security appliance available from Cisco Systems of San Jose, Calif. Other types of appliances could be used as well.

The server hosting system 104 also includes a switch 206 communicatively connected to each of the cloud IPsec appliances 204. The switch 206 is a layer 2 switch that collects and routes data (e.g., requests for communication with one or more managed servers) into a cloud 208, which can include any of a variety of layouts of managed servers, for example virtual server systems logically arranged into a plurality of virtual local area networks (VLANs), as discussed below in connection with FIG. 3. In certain embodiments, the switch 206 can be a Catalyst 3560 series switch as provided by Cisco Systems of San Jose, Calif. Other types of switches could be used as well.

Figure 3:
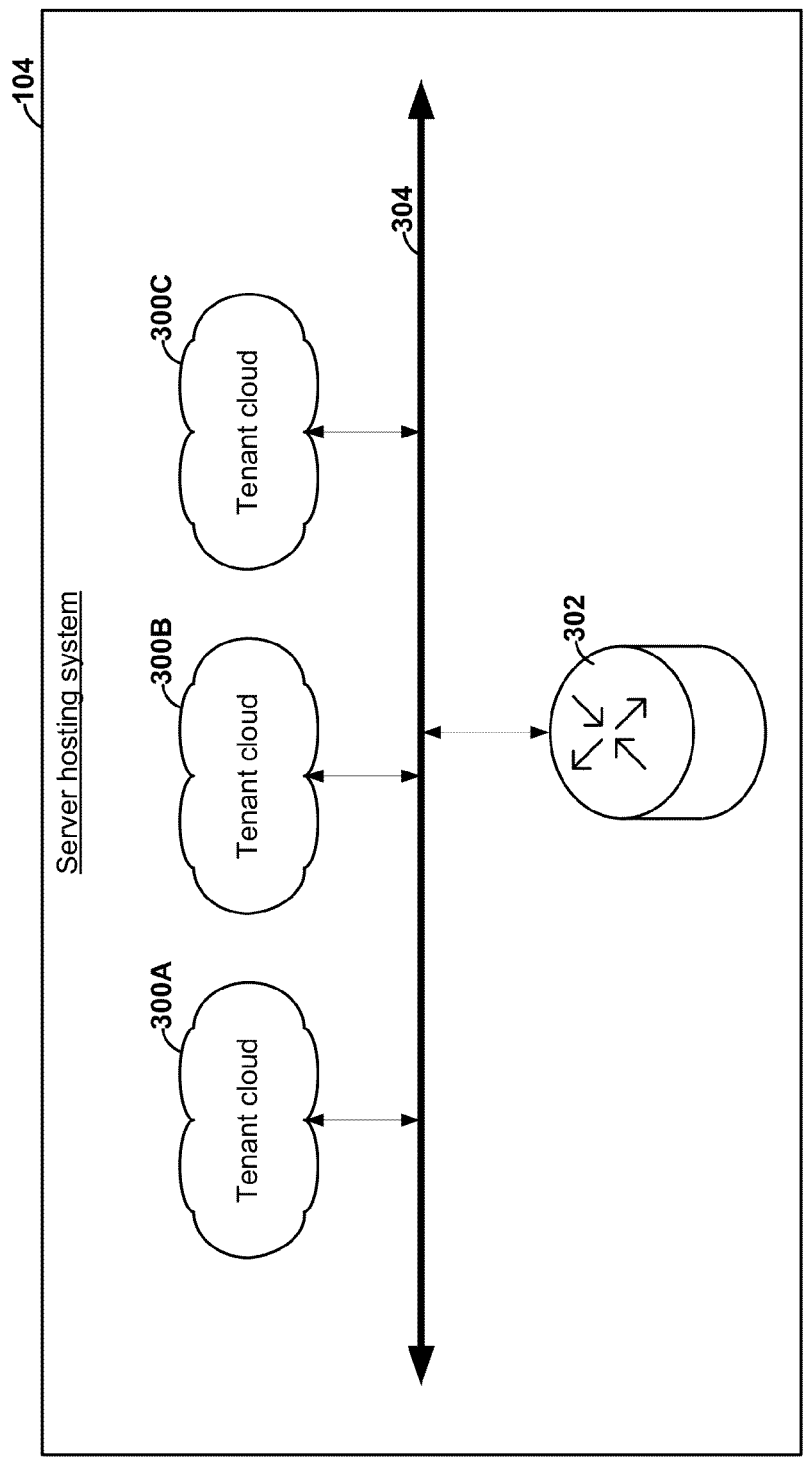
FIG. 3 is a block diagram illustrating further example details of the server hosting system.

FIG. 3 is a block diagram illustrating further details of the server hosting system 104. As illustrated in the example of FIG. 3, the server hosting system 104 includes tenant clouds 300A, 300B, and 300C. Tenant clouds 300A, 300B, and 300C are also referred to herein collectively as the tenant clouds 300. Each of the tenant clouds 300 is associated with one of the tenants 100. As illustrated in FIG. 3, it is preferable that one to one mapping of tenants and tenant clouds is maintained. Although the example of FIG. 3 shows the server hosting system 104 as including only three tenant clouds, it should be appreciated that the server hosting system 104 can include more or fewer tenant clouds.

Each of the tenant clouds 300 includes one or more managed servers, such as managed servers 102 of FIG. 1. When the server hosting system 104 receives a data packet from an external system, for example via an IPsec tunnel 205a or 205b (referred to collectively as IPsec tunnels 205) to a cloud IPsec appliance 204, the system switch 302 receives the data packet, for example from another switch (such as switch 206 of FIG. 2) and routes the data packet onto the system VLAN 304. Furthermore, the system switch 302 can route data from the system VLAN 304 to outbound portions of the server hosting system 104, for example the switch 206 and cloud IPsec appliances 204a-b of FIG. 2. In various embodiments, the system switch 302 can be implemented in various ways. For example, the system switch 302 can be implemented using a specialized switch device. In this example, the specialized switch device routes packets in hardware and/or firmware. In another example, the system switch 302 can be implemented using a computing device that is not a specialized switch device. In this example, the computing device routes packets using application- or utility-level software.

Figure 4:
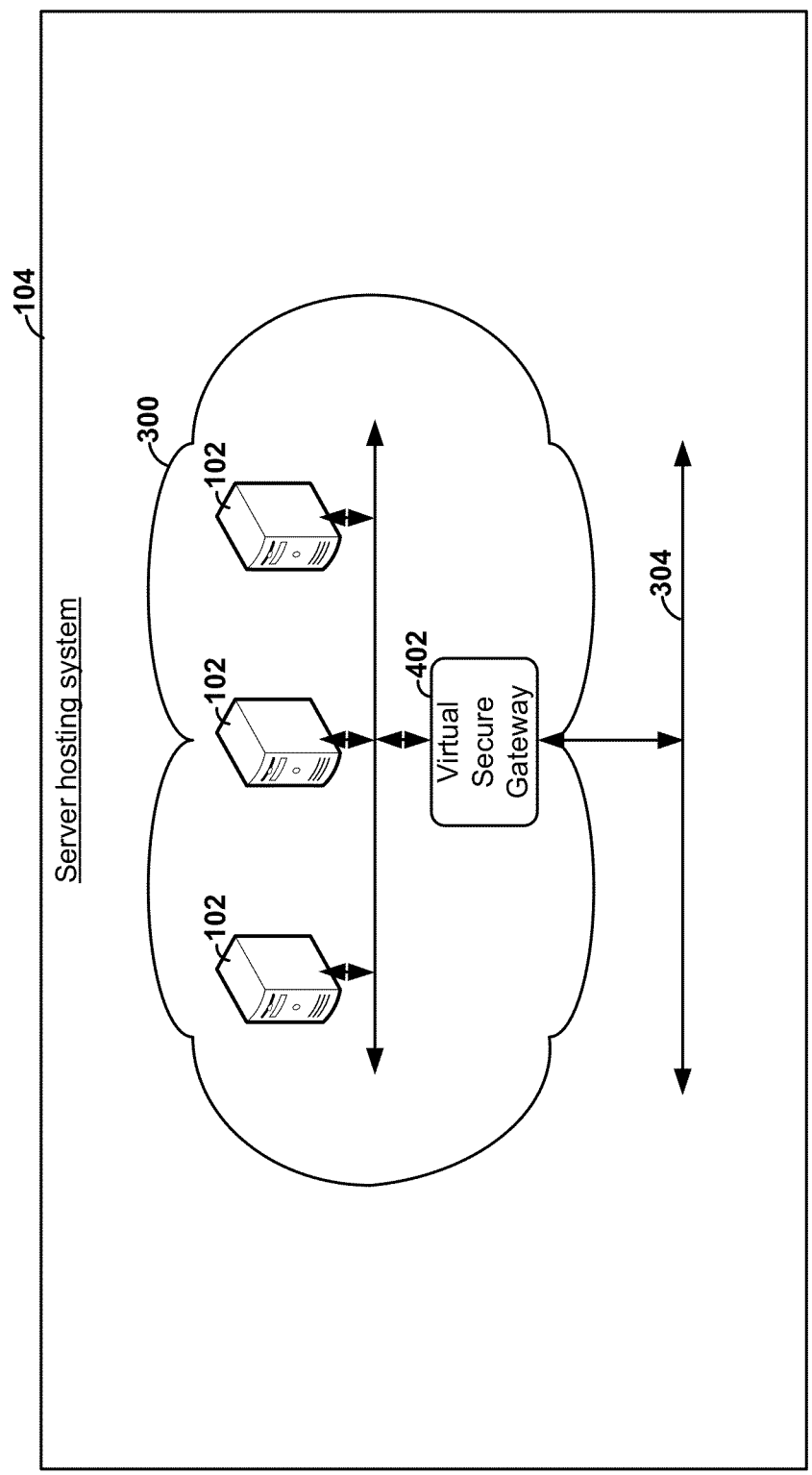
FIG. 4 is a block diagram illustrating example details of a tenant cloud within the server hosting system.

Referring now to FIG. 4, a block diagram illustrating details of a tenant cloud 300, or tenant virtual local area network ("tenant VLAN") within the server hosting system 104 is shown. As shown in FIG. 4, a tenant cloud connects to the system VLAN 304, and includes a virtual secure gateway (VSG) 402. The virtual secure gateway 402 receives data packets destined for one or more managed servers 102 within the tenant cloud 300. In certain embodiments, the virtual secure gateway is assigned an identifier, and receives data packets associated with that identifier, as discussed further in connection with FIG. 5, below.

The virtual secure gateway 402 also forms a secure communication session between each of the managed servers 102 that are a part of the tenant cloud 300 (as opposed to other tenant clouds associated with different, unaffiliated tenants). In this embodiment, the one or more managed servers 102 can be virtual systems configured to represent one or more computing systems accessible to a particular tenant, with the tenant associated with a "community" of users capable of accessing the managed servers within the tenant cloud 300.

In some embodiments, the virtual secure gateway 402 shreds and encrypts each data packet received from the system VLAN 304, and recompiles data packets received from the managed servers 104. As such, within the tenant cloud, data communication is secure, while communication on the system VLAN 304 can occur in clear text to allow inspection and routing of packets by other infrastructure within the server hosting system 104. In some embodiments, this shredding and encryption at the virtual secure gateway 402 and managed servers 102 is accomplished using the Stealth data parsing technology provided by Unisys Corporation of Blue Bell, Pa.

Figure 5:
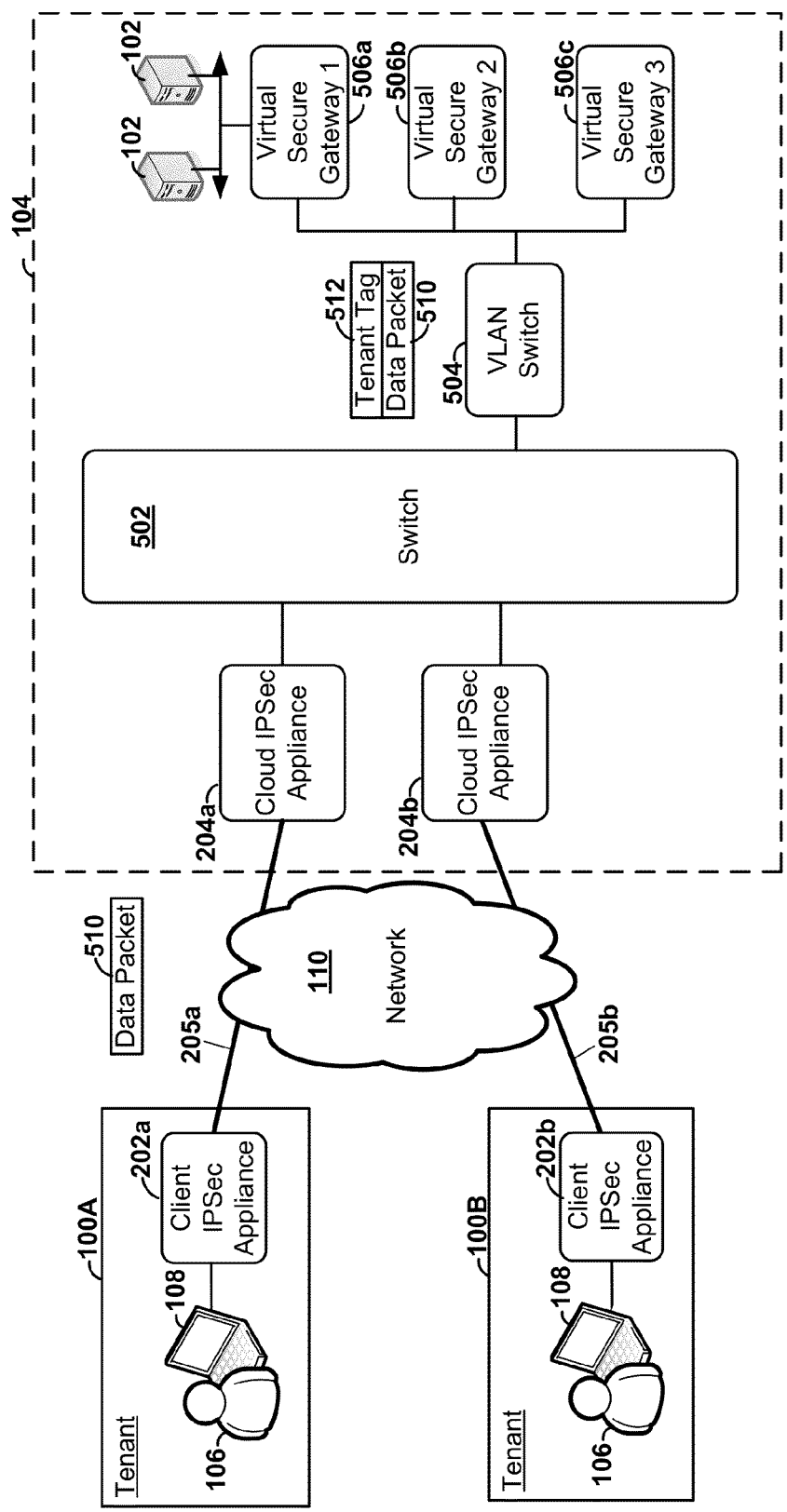
FIG. 5 is a block diagram illustrating an example embodiment of a server hosting system implementing an IPsec connection, according to a possible embodiment.

Referring now to FIG. 5, a block diagram illustrating an example embodiment of an overall network 500 including a server hosting system implementing an IPsec connection is shown, according to a possible embodiment. The network 500 illustrates one example layout of the client and server hosting system arrangements of FIGS. 1-4, in which usage examples of IPsec connection to a server hosting system can be discussed. The network 500 includes a plurality of tenants 100, shown as first and second tenants 100a and 100b, respectively. The tenants, as previously discussed, include a plurality of users 106 and computing devices 108, and at least one client IPsec appliance 202. Each tenant 100 connects to the server hosting system 104 via a network 110, which can be, in various embodiments, an Internet connection, or any other network connection. Each client IPsec appliance 202 connects to a cloud IPsec appliance 204, where there is a cloud IPsec appliance dedicated to each tenant. The client IPsec appliance can, for example, be preprogrammed to connect only to a particular cloud IPsec appliance 204 at a particular network address. The cloud IPsec appliance 204 provides an encryption key to the client IPsec appliance 202, and the appliances 202, 204 form an IPsec tunnel for secure communication between the tenant 100 and the server hosting system 104.

A switch 502 aggregates and routes data packets passing between the respective cloud IPsec appliance 204 and a VLAN switch 504. The switch can, in certain embodiments, be a layer two IP switch. In various embodiments, the switch 502 can correspond to one or more switches, or a "switch fabric", utilized to route data between cloud IPsec appliances 204 and the VLAN switch 504.

The VLAN switch 504 is connected between the switch 502 and a plurality of virtual secure gateways 402a-c, which represent access points for corresponding tenant clouds as illustrated in FIG. 3. In this embodiment, the virtual secure gateways 402a-c each provide access to managed servers 102 (shown by way of example with respect to virtual secure gateway 402a), and routing of packets between clients and respective tenant clouds associated with those clients. The virtual secure gateways 402a-c are therefore in this embodiment access points to virtual machines arranged into virtual local area networks (VLANs), such that one or more managed servers 102 are provided in each VLAN. The VLAN switch 504 routes data packets forwarded from the switch 502 to one of a plurality of virtual secure gateways 402a-c, which provide an access point for data destined for a particular virtual machine. In certain embodiments, the VLAN switch 504 can correspond to the system switch 302 of FIG. 3.

In certain embodiments, the virtual secure gateways 402a-c represent an entry point into a tenant-specific secure virtual network, or "tenant cloud", for example enabled using Stealth data parsing technology provided by Unisys Corporation of Blue Bell, Pa. As previously mentioned, each virtual secure gateway 402a-c can be identified with a particular gateway identifier, which resultingly identifies the tenant VLAN or cloud accessible by a particular tenant.

In certain embodiments, the VLAN switch 504 inspects each data packet received from the switch 502, in particular a tag 510 identifying the destination managed server for the data packet. The tag 510 can, in certain embodiments, be applied by the cloud IPsec appliance 204 that receives the packet from a client 100. As such, each cloud IPsec appliance 204 applies a same unique tag to each packet it receives from a client, because only one client connects to each IPsec appliance. For example, in the illustration of FIG. 5, cloud IPsec appliance 204a does not connect to client IPsec appliance 202b, and cloud IPsec appliance 204b does not connect to client IPsec appliance 202a, respectively. In some embodiments, the switch 502 and VLAN switch 504 can be incorporated into a single device, or multiple switching devices.

In an example embodiment, the tag 510 can represent an identity of a virtual secure gateway to which the data packet is destined. For example, a cloud IPsec appliance 204a could be configured to apply a tag representing "Virtual Secure Gateway 1" (VSG 506a) to a data packet 510, such that when the packet arrives at the VLAN switch 404, the packet is routed to the VSG identified by the tag, in this case, VSG 506a. Data packets routed from the virtual secure gateway can likewise be tagged with the identity of that VSG, such that the VLAN switch 504 and switch 502 is instructed to route those packets to the correct cloud IPsec appliance 204. Continuing the above example, packets tagged "Virtual Secure Gateway 1" from VSG 506a would only be routed to IPsec appliance 204a.

In some embodiments, the tag 510 can be managed by an IPsec appliance 204 and the VLAN switch 504 in accordance with IEEE specification 802.1Q, available at http://standards-.ieee.org/, the specification of which is hereby incorporated by reference in its entirety.

In the embodiment shown, a tenant 100 will configure their client IPsec device 202 to identify a particular cloud IPsec appliance 204 to which it will connect. Additionally, the tenant will identify a specific VLAN or group of managed servers that tenant has access to at the server hosting system 104. The cloud IPsec appliance 204 will provide to the client IPsec appliance 202 a preshared encryption key used to establish the IPsec tunnel between those devices. Through use of the dedicated cloud IPsec appliance 204 for each tenant and dedicated VSGs 402 for each tenant cloud, data can be secured and routed from a tenant to a managed server that the tenant wishes to access.

In one possible example data flow illustrating a data packet 510 traveling from a tenant 100 to a managed server 102 (e.g., as a request for access to data or computing resources of that managed server), a user 106 will at a computing device 108 will request access to a server, for example based on a name of that server or an application stored on the server. Authentication of the remote endpoint of an IPsec tunnel uses configuration and a pre-shared secret (key). The computing device 108 will form a data packet 510 including a request for access, and forward that request to the client IPsec appliance, e.g. appliance 202a. Once a tunnel is established, the data packet is transmitted, in encrypted form, over the IPsec tunnel, using encryption methods such as 3DES/SHA1 or other methods.

The cloud IPsec appliance 204 will receive the data packet 510, and in certain embodiments, apply a tag 512 to the data packet identifying the source (e.g., the tenant) from which the data packet was received. For example, in the embodiment of FIG. 5, cloud IPsec appliance 204a will include a tag identifying tenant 100a, based on the fact that the data packet was received from client IPsec appliance 202a. The data packet is then forwarded to switch 502, which passes the packet (along with other aggregated, tagged data packets from other cloud IPsec appliances) to the VLAN switch 504.

At the VLAN switch 504, address information in the data packet 510 is examined to determine the intended destination for the data packet. The data packet 510 is then forwarded to the VLAN associated with that tenant and which includes the managed server identified by the address in the data packet 510.

Figure 6:
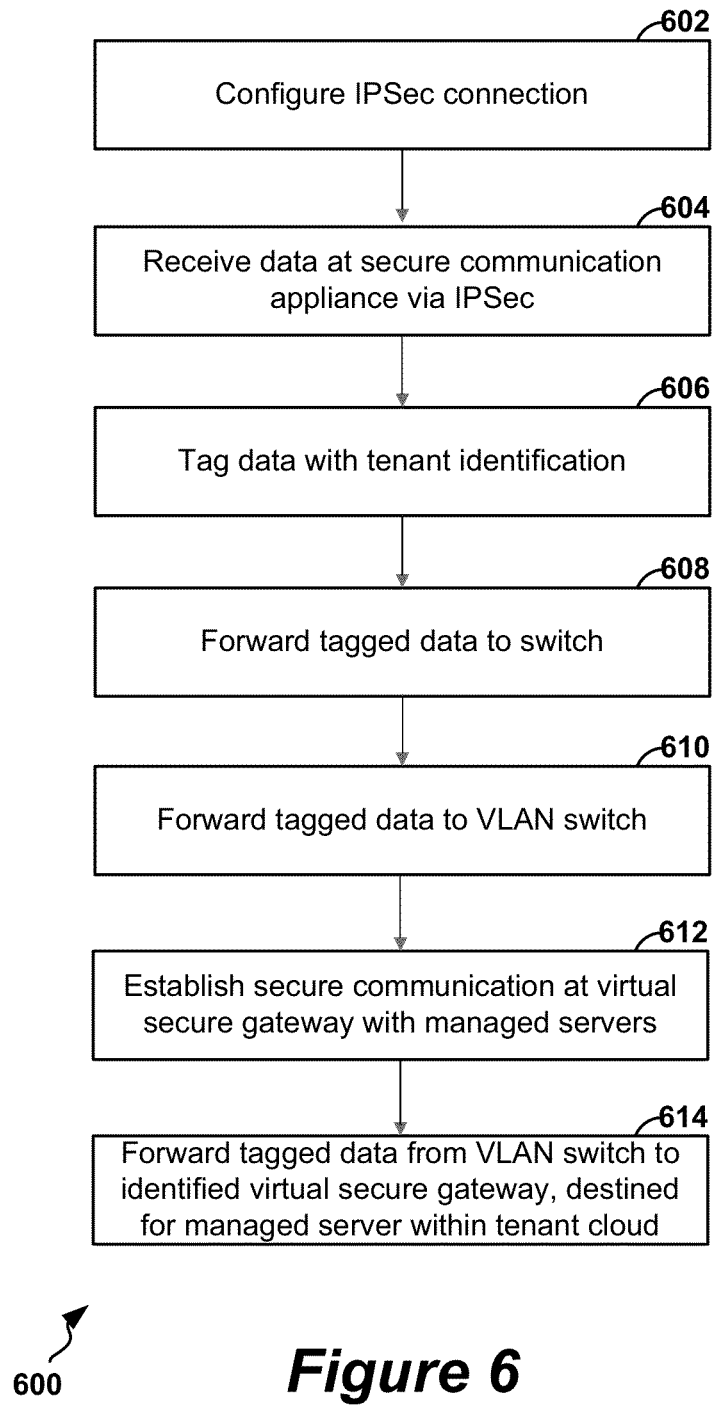
FIG. 6 is a flowchart of a method for securing communications between a tenant and a managed server, according to a possible embodiment.

FIG. 6 is a flowchart of a method for communicating between a tenant and a managed server is shown, according to a possible embodiment of the present disclosure. The method 600 includes a method of securing communication between the tenant and managed server.

As illustrated, the method begins at a configuration operation 602, which configures one or more client IPsec appliances 202 and cloud IPsec appliances 204 at one or more tenants 100 and the server hosting system 104, respectively. This configuration can include, for example, exchange of an encryption key useable to establish the IPsec tunnel between devices, as well as selecting an encryption algorithm and authentication algorithm for use.

A data receipt operation 604 corresponds to initial receipt at a cloud IPsec appliance 204 from a client IPsec appliance 202 of data from a tenant 100. The data can be a data packet addressed to a particular managed server 102, for example a virtual machine included within a tenant cloud 300 as illustrated in FIG. 4.

A tagging operation 606 occurs at the cloud IPsec appliance 204, and applies a tag identifying a tenant within the data packet received at that appliance. The tag can take a variety of forms, but identifies the tenant within the packet.

A switch forwarding operation 608 forwards the data packet to a switch (e.g., switch 402 of FIG. 4), for aggregation with other traffic received from IPsec appliances, and a VLAN switch forwarding operation 610 forwards that traffic, including the data packet, to a VLAN switch, such as the switch 502 of FIG. 5.

A secure connection creation operation 612 creates a secure connection between a virtual secure gateway and a managed server to secure data, such as the VSG 402 and managed server 102 of FIG. 4. For example, the secure connection creation operation 612 can create a Stealth-enabled tunnel between a VSG and a particular virtual machine, so data exchanged within the tenant cloud cannot be observed by other tenants using the server hosting system 104.

A managed server forwarding operation 614 occurs at the VLAN switch 504, and includes examination of the data packet and tag to (1) verify the intended destination of the data packet (i.e., the managed server identified by the header address in the data packet) and the identity of the tenant attempting to access that managed server. If the managed server is in a VLAN (tenant cloud) that the tenant is able to access, the data packet forwards the data packet to the identified managed server within the authorized VLAN.

Figure 7:
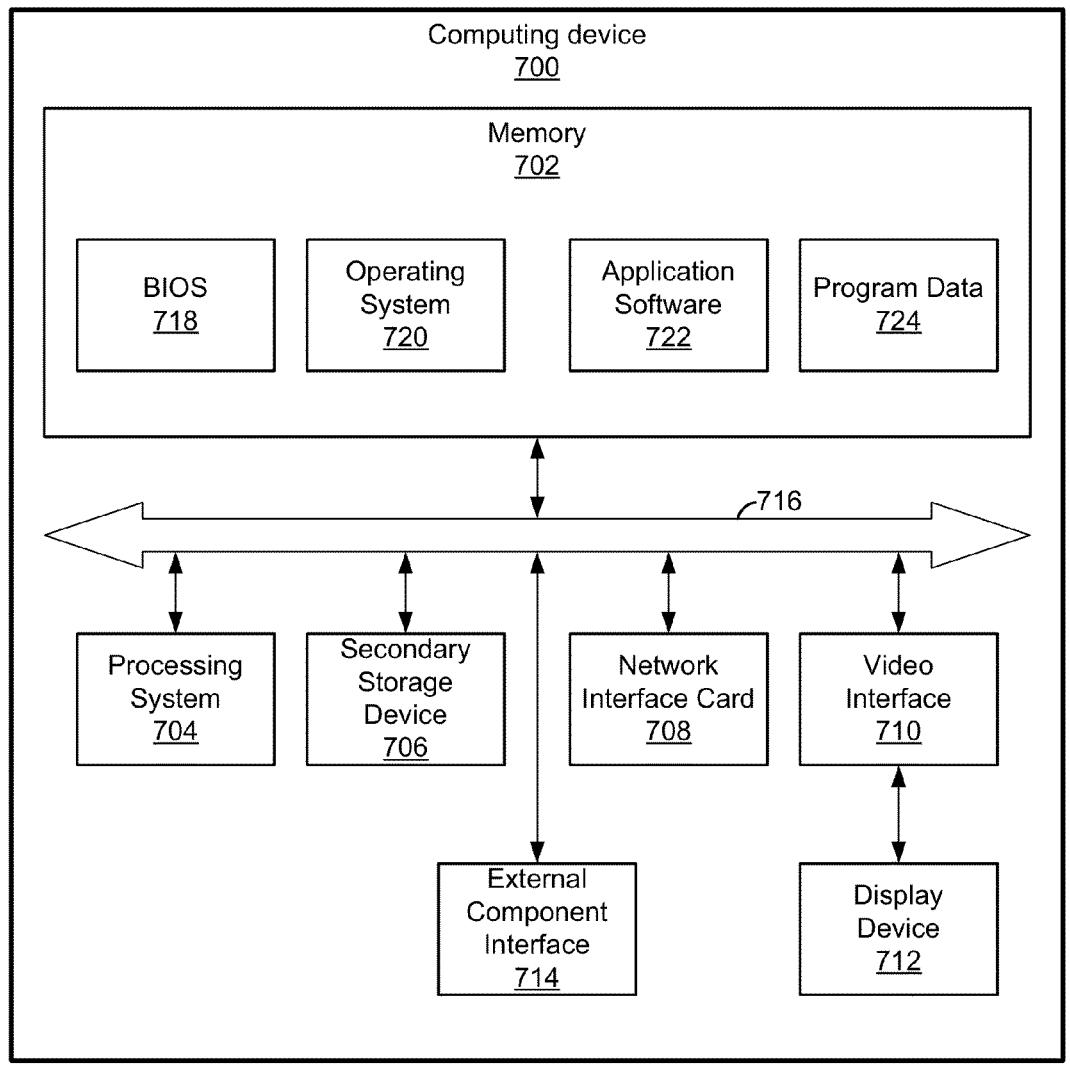
FIG. 7 is a block diagram illustrating example physical details of an electronic computing device, with which aspects of the present disclosure can be implemented.

FIG. 7 is a block diagram illustrating an example computing device 700. In some embodiments, the computing devices 108 and the computing devices in the server hosting system 104 are implemented as one or more computing devices like the computing device 700. It should be appreciated that in other embodiments, the computing devices 108 and computing devices in the server hosting system 104 are implemented using computing devices having hardware components other than those illustrated in the example of FIG. 7.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 7, the computing device 700 includes a memory 702, a processing system 704, a secondary storage device 706, a network interface card 708, a video interface 710, a display unit 712, an external component interface 714, and a communication medium 716. The memory 702 includes one or more computer storage media capable of storing data and/or instructions. In different embodiments, the memory 702 is implemented in different ways. For example, the memory 702 can be implemented using various types of computer storage media.

The processing system 704 includes one or more processing units. A processing unit is a physical device or article of manufacture comprising one or more integrated circuits that selectively execute software instructions. In various embodiments, the processing system 704 is implemented in various ways. For example, the processing system 704 can be implemented as one or more processing cores. In another example, the processing system 704 can include one or more separate microprocessors. In yet another example embodiment, the processing system 704 can include an application-specific integrated circuit (ASIC) that provides specific functionality. In yet another example, the processing system 704 provides specific functionality by using an ASIC and by executing computer-executable instructions.

The secondary storage device 706 includes one or more computer storage media. The secondary storage device 706 stores data and software instructions not directly accessible by the processing system 704. In other words, the processing system 704 performs an I/O operation to retrieve data and/or software instructions from the secondary storage device 706. In various embodiments, the secondary storage device 706 includes various types of computer storage media. For example, the secondary storage device 706 can include one or more magnetic disks, magnetic tape drives, optical discs, solid state memory devices, and/or other types of computer storage media.

The network interface card 708 enables the computing device 700 to send data to and receive data from a communication network. In different embodiments, the network interface card 708 is implemented in different ways. For example, the network interface card 708 can be implemented as an Ethernet interface, a token-ring network interface, a fiber optic network interface, a wireless network interface (e.g., WiFi, WiMax, etc.), or another type of network interface.

The video interface 710 enables the computing device 700 to output video information to the display unit 712. The display unit 712 can be various types of devices for displaying video information, such as a cathode-ray tube display, an LCD display panel, a plasma screen display panel, a touch-sensitive display panel, an LED screen, or a projector. The video interface 710 can communicate with the display unit 712 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 714 enables the computing device 700 to communicate with external devices. For example, the external component interface 714 can be a USB interface, a FireWire interface, a serial port interface, a parallel port interface, a PS/2 interface, and/or another type of interface that enables the computing device 700 to communicate with external devices. In various embodiments, the external component interface 714 enables the computing device 700 to communicate with various external components, such as external storage devices, input devices, speakers, modems, media player docks, other computing devices, scanners, digital cameras, and fingerprint readers.

The communications medium 716 facilitates communication among the hardware components of the computing device 700. In the example of FIG. 7, the communications medium 716 facilitates communication among the memory 702, the processing system 704, the secondary storage device 706, the network interface card 708, the video interface 710, and the external component interface 714. The communications medium 716 can be implemented in various ways. For example, the communications medium 716 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718 and an operating system 720. The BIOS 718 includes a set of computer-executable instructions that, when executed by the processing system 704, cause the computing device 700 to boot up. The operating system 720 includes a set of computer-executable instructions that, when executed by the processing system 704, cause the computing device 700 to provide an operating system that coordinates the activities and sharing of resources of the computing device 700. Furthermore, the memory 702 stores application software 722. The application software 722 includes computer-executable instructions, that when executed by the processing system 704, cause the computing device 700 to provide one or more applications. The memory 702 also stores program data 724. The program data 724 is data used by programs that execute on the computing device 700.

Overall, a number of advantages of the methods and systems of the present disclosure exist. For example, tenant systems are not required to specially identify the data transmitted to the server hosting system via the IPsec connection, and therefore each tenant can use industry-standard, lower cost networking equipment. Additionally, the cloud IPsec appliances as recited herein only are required to apply a single tag to the data packets received, since they are dedicated to a particular tenant. Furthermore, use of IPsec appliances provides a further way in which tenants can access managed servers in the server hosting system, thereby providing increased flexibility in connection methods. Additional advantages exist as well.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A server hosting system comprising:
a plurality of managed servers;
a first secure communication appliance configured to connect to a tenant appliance at a first tenant using an IPsec tunnel, the first secure communication appliance further configured to route data between a first managed server of the plurality of managed servers and the tenant appliance at the first tenant, the first managed server associated with the first tenant;
a second secure communication appliance configured to connect to a tenant appliance at a second tenant using an IPsec tunnel, the second secure communication appliance further configured to route data between a second managed server of the plurality of managed servers and the tenant appliance at the second tenant, the second managed server associated with the second tenant;
wherein the first secure communication appliance is configured to apply a first tag to data received from the tenant appliance at the first tenant identifying the first tenant, and wherein the second secure communication appliance is configured to apply a second tag to data received from the tenant appliance at the second tenant identifying the second tenant.

2. The server hosting system of claim 1, wherein at least one of the first and second managed servers is assigned a tenant virtual local area network (VLAN).

3. The server hosting system of claim 1, wherein the first tag identities a virtual secure gateway associated with the first tenant, and the second tag identifies a second virtual secure gateway associated with a second tenant.

4. The server hosting system of claim 3, wherein the first virtual secure gateway is configured to establish a secure communication connection with at least the first managed server, and wherein the second virtual secure gateway is configured to establish a secure communication connection with at least the second managed server.

5. The server hosting system of claim 4, wherein the secure communication session comprises a Stealth-enabled encrypted communication session.

6. The server hosting system of claim 1, further comprising a switch communicatively connected to the first and second secure communication appliances, the switch configured to route data from the first secure communication appliance to the first managed server based at least in part on the tag identifying the first tenant and to route data from the second secure communication appliance to the second managed server based at least in part of the tag identifying the second tenant.

7. The server hosting system of claim 6, wherein the switch is a virtual local area network (VLAN) switch.

8. The server hosting system of claim 6, further comprising a second switch communicatively connecting the VLAN switch to the first and second secure communication appliances.

9. The server hosting system of claim 1, wherein the second secure communication appliance does not communicate with the tenant appliance at the first tenant, and the first secure communication appliance does not communicate with the tenant appliance at the second tenant.

10. The server hosting system of claim 1, wherein the IPsec tunnel between the first secure communication appliance and the tenant appliance at the first tenant is created using a key shared for authentication and data is encrypted using configured encryption methods with the tenant appliance at the first tenant from the first secure communication appliance.

11. The server hosting system of claim 1, wherein at least one of the first and second managed servers comprises a virtual machine.

12. The server hosting system of claim 1, wherein the first and second managed servers each comprise a different virtual machine, and wherein the first and second managed servers execute on a common computing device.

13. A method of securing communications between a tenant and a server hosting system, the method comprising:
receiving data at a first secure communication appliance from a tenant appliance at a first tenant;
applying a first tag to the data at the first secure communication appliance, the tag identifying the first tenant as the source of the data;

forwarding the data including the first tag to a first managed server associated with the first tenant;

receiving data at a second secure communication appliance from a tenant appliance at a second tenant separate from the first tenant;

applying a second tag to the data at the first secure communication appliance, the tag identifying the second tenant as the source of the data; and forwarding the data including the second tag to a second managed server associated with the second tenant.

14. The method of claim 13, wherein the first and second managed servers each comprise a different virtual machine, and wherein the first and second managed servers execute on a common computing device.

15. The method of claim 13, wherein the second secure communication appliance does not communicate with the tenant appliance at the first tenant and the first secure communication appliance does not communicate with the tenant appliance at the second tenant.

16. The method of claim 13, wherein one or more of the plurality of managed servers is assigned a tenant virtual local area network (VLAN).

17. The method of claim 13, further comprising sharing an encryption key generated at the first secure communication device with the tenant device at the first tenant.

18. The method of claim 13, wherein receiving data at the first secure communication appliance includes receiving a request for access to data at the first managed server.

19. The method of claim 13, wherein the first secure communication appliance resides within a server hosting system.

20. The method of claim 13, wherein the first managed server is assigned to a first tenant virtual local area network (VLAN), and wherein data including the first tag is forwarded only to the first tenant VLAN.

21. A non-transitory computer storage medium comprising computer-executable instructions, which when executed on a computing device in a server hosting system cause the computing device to provide a first secure communication appliance configured to:

receive a request to access a managed server from a tenant appliance at a first tenant via an IPsec connection, the first managed server including at least one virtual machine;

applying a tag to the data, the tag identifying a virtual secure gateway associated with a tenant;

route the data including the tag to the managed server associated with the first tenant via a virtual local area network switch and the virtual secure gateway;

receiving data at a second secure communication appliance from a tenant appliance at a second tenant separate from the first tenant;

applying a second tag to the data at the first secure communication appliance, the tag identifying the second tenant as the source of the data; and forwarding the data including the second tag to a second managed server associated with the second tenant.

* * * * *